United States Patent [19]
Forney, Jr.

[11] Patent Number: 4,894,844
[45] Date of Patent: Jan. 16, 1990

[54] SIGNAL CONSTELLATIONS

[75] Inventor: George D. Forney, Jr., Cambridge, Mass.

[73] Assignee: Codex Corporation, Mansfield, Mass.

[21] Appl. No.: 62,497

[22] Filed: Jun. 12, 1987

[51] Int. Cl.$^4$ .......................................... H04L 27/04
[52] U.S. Cl. ...................................... 375/42; 371/43; 375/39
[58] Field of Search ................ 375/39, 41, 42; 371/43

[56] References Cited

U.S. PATENT DOCUMENTS

| | | | |
|---|---|---|---|
| 3,805,191 | 4/1974 | Kawai et al. | 375/42 |
| 4,495,477 | 1/1985 | Weber | 375/42 |
| 4,538,284 | 8/1985 | Lang et al. | 375/42 |
| 4,562,426 | 12/1985 | Forney | 371/43 |
| 4,630,287 | 12/1986 | Armstrong | 375/39 |
| 4,713,817 | 12/1987 | Wei | 371/43 |

OTHER PUBLICATIONS

Simon et al; Hexagonal Multiple Phase and Amplitude Shift Keyed Signal Sets; 10/73; IEEE Trans. on Comm., vol. 21, No. 10; pp. 1408-1115.
Conway et al; A Fast Encoding Method for Lattice Codes and Quantizers; 11/83; IEEE Trans. on Info. Theory, vol. 29, No. 6; pp. 820-824.
Conway et al., "Fast Quantizing and Decoding Algorithms for Lattice Quantizers and Codes", IEEE Transactions, vol. IT-28, No. 2, Mar. 1982; pp. 227-232.
Forney et al., "Efficient Modulation for Band-Limited Channels", IEEE Journal on Selected Areas on Communications, vol. SAC-2; No. 5, Sep. 1984, pp. 632-647.
Conway et al., "Soft Decoding Techniques for Codes and Lattices, Including the Golay Code and the Leech Lattice"; IEEE Transactions, vol. IT-32, No. 1, Jan. 1982, pp. 41-50.

Primary Examiner—Robert L. Griffin
Assistant Examiner—M. Huseman
Attorney, Agent, or Firm—Fish & Richardson

[57] ABSTRACT

A Voronoi signal constellation includes those points of a coset of a lattice $\Lambda$ that lie within a Voronoi region of a sublattice $\Lambda'$ of $\Lambda$, where $\Lambda'$ is other than a scaled version of $\Lambda$. The Voronoi signal constellation is combined with a coset code. A method of mapping data words to Voronoi constellation points is described.

18 Claims, 5 Drawing Sheets

SIGNAL CONSTELLATIONS

BACKGROUND OF THE INVENTION

This invention relates to signal constellations for communication systems.

In communication systems using modems, for example, data is sent over a noise-affected channel by modulating a carrier in accordance with a series of signal points drawn from a constellation of available signal points. In a quadrature amplitude modulation (QAM) system, the constellation is two-dimensional. It is known that certain advantages can be achieved using higher-dimensional constellations to define the points to be transmitted.

An N-dimensional (N greater than 2) constellation C is a finite set of N-tuples (i.e. points each having N coordinates that together define a location in N-space). The principal characteristics of such a constellation are the number $|C|$ of its points, the minimum squared distance $d_{min}^2$ (C) between its points, and its average energy (or average Euclidean norm) P(C). For a given number of points, the figure of merit of a constellation when used for signaling is $P(C)/d_{min}^2$ (C) (the smaller, the better).

A general known method of constructing a good constellation (one with a small figure of merit) having a desired number of points is to choose a finite set of points from a so-called dense (tightly packed) N-dimensional lattice $\Lambda$, or from a coset of $\Lambda$ (i.e., a translated version of $\Lambda$). The points may be selected by defining a region R in N-space that is just large enough to contain the desired number of points. The minimum squared distance $d_{min}^2$ (C) of the constellation is the minimum squared distance $d_{min}^2$ ($\Lambda$) of the lattice $\Lambda$; in general, to minimize the average energy P(C), the region R should resemble as nearly as possible an N-sphere centered on the origin.

Conway and Sloane, "A Fast Encoding Method for Lattice Codes and Quantizers," IEEE Trans. Inform. Theory, Vol. IT-29, pp. 820–824, 1983, incorporated herein by reference, propose the following way to define such a region R containing the desired number of points. Suppose that a given N-dimensional lattice $\Lambda$ has as a sublattice a scaled version $M\Lambda$ of the same lattice, where M is an integer scaling factor. That is, the sublattice is a subset of the points of the lattice selected so that the sublattice will be simply a larger scale version of the lattice. (Note that $M\Lambda$ and $\Lambda$ are lattices of the same type.) Then there are $M^N$ equivalence classes of points in the original lattice $\Lambda$ (or any coset of $\Lambda$) module $M\Lambda$. Note that two N-tuples are equivalent modulo $M\Lambda$ (and hence belong to an equivalence class) if their difference is a point in $M\Lambda$.

The so-called Voronoi region of the lattice $M\Lambda$ is the set of points in N-space that are at least as close to the origin as to any other lattice point in $M\Lambda$. The interior of the Voronoi region may be defined as the set of points closer to the origin than to any other lattice point; the boundary of the Voronoi region is the set of points for which the origin is one of the closest points in the lattice, but for which there are other equally near lattice points. In general, the boundary is a closed surface in N-space, composed of a certain number of (N−1)-dimensional faces, which are portions of hyperplanes equidistant between two neighboring lattice points in $M\Lambda$. (For example, the Voronoi region of an N-dimensional integer lattice $Z^N$ is an N-cube of side 1, whose faces are (N−1)-cubes of side 1. The intersections of the faces are figures of N−2 or fewer dimensions and have more than two nearest neighbors.)

Therefore, if $\Lambda + c$ is a coset of the original lattice (where c is the translation vector) that is chosen to have no points on the boundary of the Voronoi region of the scaled lattice $M\Lambda$, then the Voronoi region contains $M^N$ points of the coset $\Lambda + c$, one from each equivalence class modula $M\Lambda$, and the $M^N$ point Voronoi region may serve as a signal constellation called a Voronoi constellation (Conway and Sloane call it a Voronoi code). Such constellations are characterized by relatively small average energy and are subject to relatively simple implementation.

SUMMARY OF THE INVENTION

A general feature of the invention, for communicating data over a channel, comprises selecting a series of signal points from a constellation comprising points of a lattice $\Lambda$ (or a coset of $\Lambda$) that lie within a Voronoi region of a sublattice $\Lambda'$ of $\Lambda$, where $\Lambda'$ is other than a scaled version of $\Lambda$, and modulating a carrier on the channel in accordance with the selected series of signal points.

Preferred embodiments include the following features. Sublattice $\Lambda'$ is a different type from lattice $\Lambda$. The constellation is based on points in a fundamental region of sublattice $\Lambda'$ comprising a maximally biased selection of fewer than all points in the Voronoi region. Some points of the fundamental region lie on a boundary of the Voronoi region. The lattice $\Lambda$ is a version of an integer lattice $Z^N$, N an integer. The sublattice $\Lambda'$ may be a version of a Schläfli lattice $D_4$, or a version of a Barnes-Wall lattice $\Lambda_{16}$.

Another general feature of the invention is selecting a series of signal points from a constellation of available points based on a code, the constellation being a Voronoi constellation, the code being a coset code, and modulating a carrier in accordance with the selected series of signal points.

Preferred embodiments include the following features. The coset code may have the same number of dimensions (e.g. 4) as the Voronoi constellation or a different number of dimensions (e.g., the coset code may have 4 dimensions and the Voronoi constellation may have 16 dimensions).

Another general feature of the invention provides a method of mapping from m data bits to a $2^m$-point Voronoi constellation to be transmitted on a channel based on an N-dimensional lattice partition $\Lambda/\Lambda'$, where sublattice $\Lambda'$ is other than a scaled version of lattice $\Lambda$, comprising (i) mapping the m bits to one of $2^m$ data words x, each data word x consisting of N coordinates $(x_1, \ldots x_n)$, each coordinate taking on one of a predetermined set of values, the number of elements in different such sets of coordinate values not being identical, each data word being a point in a coset of $\Lambda$ that belongs to a distinct equivalence class modulo $\Lambda'$; (ii) decoding the data word x into a point $\lambda$ in $\Lambda'$; and (iii) using the apparent error $e = x - \lambda$ (or a translate $e - c$ of the apparent error) as the coordinates of the constellation point to be transmitted.

Constellations having a number $|\Lambda/\Lambda'|$ of points other than simply the $N^{th}$ power of an integer ($M^N$) may be constructed, where $|\Lambda/\Lambda'|$ is the order of the partition (quotient group). Even if the original lattice $\Lambda$ is not a dense lattice (e.g. the N-dimensional integer lattice $Z^N$) which may have advantages in certain coding schemes (e.g., coset codes), the Voronoi region of a dense lattice $\Lambda'$ may be used to define the boundary of the constellation, thus achieving the advantage of a quasi-spherical constellation. The method of mapping data words to Voronoi constellation points is simple to implement.

Other advantages and features will become apparent from the following description of the preferred embodiment, and from the claims.

DESCRIPTION OF THE PREFERRED EMBODIMENT

We first briefly describe the drawings.

GENERAL METHOD OF FORMING A VORONOI CONSTELLATION

We first state a general method of generating optimal Voronoi constellations.

Preliminarily, we define a fundamental region of a lattice $\Lambda$ as a region that contains one and only one point from every equivalence class of N-tuples modulo $\Lambda$. Every fundamental region has the same volume $V(\Lambda)$.

The Voronoi region of a lattice $\Lambda$ contains a fundamental region of $\Lambda$, consisting of all points in the interior plus a subset of points on the boundary such that the subset contains one and only one point from each equivalence class modulo $\Lambda$. In fact, the boundary of the region also contains additional points not in the fundamental region.

Let $\Lambda$ be a lattice, $\Lambda'$ any sublattice of $\Lambda$, and $|\Lambda/\Lambda'|$ the order of the lattice partition (quotient group) $\Lambda/\Lambda'$. Let R be a fundamental region of $\Lambda'$ that includes the interior of the Voronoi region of $\Lambda'$ as well as a subset of the boundary. Then R contains precisely $|\Lambda/\Lambda'|$ points of $\Lambda$. The points in R will form the basis of the constellation.

Because the boundary includes more points than are needed to complete the region R, some choice among points on the boundary must be made. The choice is preferably made in such a way that the selected points are (we shall say) maximally biased, as follows. Let b be any point on the boundary of the Voronoi region of $\Lambda'$, and let cl(b) be the set of points on the boundary equivalent to b modulo $\Lambda'$. (The size of this set will be equal to the number of nearest neighbors of b in $\Lambda'$; furthermore, the vectors joining b to its nearest neighbors correspond to the elements of cl(b), so every point of cl(b) has the same norm.) We need to choose a single one of the points in the set cl(b) for inclusion in the constellation. Let $cl_1(b)$ be the subset of points of cl(b) that have the largest first coordinate; let $cl_2(b)$ be the subset of points of $cl_1(b)$ that have the largest second coordinate, and so on. Eventually, for some i, $cl_i(b)$ will have only one point; we choose it as the one point from cl(b) to be included in R. The same process is repeated until all points on the boundary have been dealt with.

Let $C_0$ then be the set (constellation) of $|\Lambda/\Lambda'|$ points of $\Lambda$ in region R that result from this point selection process. If c is the mean of the points, then the next step is to let the Voronoi constellation C be a translation of $C_0$ by c, such that the mean of C is 0. Thus C is a set of $|\Lambda/\Lambda'|$ points of the coset $\Lambda-c$ of $\Lambda$.

Figure 1:
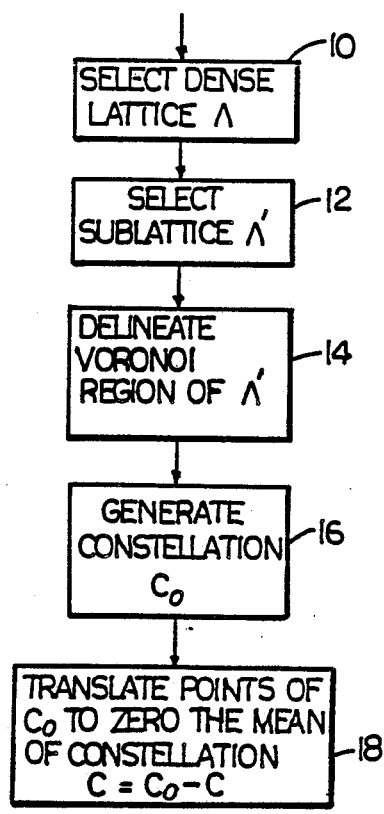
FIG. 1 is a flow-chart for forming a Voronoi constellation.

Referring to FIG. 1, in summary the process of forming the Voronoi constellation involves selecting a lattice $\Lambda$ (10); selecting an appropriate sublattice $\Lambda'$ (12); delineating the Voronoi region of the sublattice (14); selecting one point from each equivalence class on the boundary of the Voronoi region to generate a constellation $C_0$, representing points of $\Lambda$ that lie within a fundamental region R of $\Lambda'$ (16) preferably in a maximally biased fashion; and translating points of the constellation $C_0$ by a vector c, if needed, to create a constellation $C=C_0-c$ for which the mean is 0 (18).

The motivation for generating the Voronoi constellation by the maximally biased technique is as follows. The average energy P(C) of the points in C is the variance of the norm of the points in $C_0$, which is their average norm $P(C_0)$ minus the norm of their mean c. By our maximally biased selection of boundary points to be in R, we are trying to maximize first the first coordinate of c, next the second coordinate, and so forth. If all but one of the equivalence class ties (of $\Lambda$ modulo $\Lambda'$) has been resolved, such that absent the resolution of the last class the mean c has positive decreasing coordinates, then the resolution of the last class as specified above is such as to maximize the norm of the final c. But this is just what we want to do to minimize the variance of the norm in $C_0$, and thus the average energy P(C) of C.

We believe that selection of a Voronoi constellation in this way (i.e., a maximally biased selection) results in an optimal constellation; i.e., a constellation with the minimum P(C) among all possible Voronoi constellations based on the lattice partition $\Lambda/\Lambda'$. However, where the number $|\Lambda/\Lambda'|$ of constellation points is large, it does not much matter how boundary ties are resolved, because all Voronoi constellations C will have P(C) approximately equal to $P(C_0)$ The boundary ties may then be resolved by other criteria, such as symmetry, as desirable for particular applications.

DECODERS FOR VORONOI CONSTELLATIONS

A decoder (or quantizer) of a lattice $\Lambda$ is a map from at least some points r in N-space to lattice points in the lattice $\Lambda$. An exhaustive decoder is one that maps every point in N-space to a lattice point. A minimum-distance decoder is a map that always yields a lattice point nearest to r. A fair decoder is a decoder such that if r is mapped to $\lambda$, and $\lambda'$ is any lattice point, then $r+\lambda'$ is mapped to $\lambda+\lambda'$.

A fundamental region R of $\Lambda'$ that contains the interior of a Voronoi region of $\Lambda'$ can be used to define a fair, exhaustive, minimum-distance (FEMD) decoder as follows. Every point r in N-space (whether or not in region R) is equivalent to a unique point a in R, and is thus equal to a unique $a+\lambda$ for some lattice point $\lambda$ of $\Lambda'$. The mapping that associates this $\lambda$ with each r is the desired decoder.

Conversely, any FEMD decoder of $\Lambda'$ defines a fundamental region R of $\Lambda$ that contains the interior of a Voronoi region of Λ': namely, the set of all points r that map to 0. An FEMD decoder for which this fundamental region is maximally biased will be called a maximally biased decoder.

Efficient minimum-distance decoders are already known for many lattices (see, e.g., Conway and Sloane, "Fast Quantizing and Decoding Algorithms for Lattice Quantizers and Codes." IEEE Trans. Inform. Theory, Vol. IT-28, pp. 227–232, 1982; Forney et al. "Efficient Modulation for Band-Limited Channels", IEEE J. Select. Areas Commun., vol. SAC-2, pp. 632–647, 1984; Conway and Sloane, "Decoding Techniques for Codes and Lattices, Including the Golay Code and the Leech Lattice," IEEE Trans. Inform. Theory, vol. IT-32, pp. 41–50, 1986; and Forney, U.S. patent application Ser. No. 828,397, filed Feb. 11, 1986, assigned to the same assignee as this application; all incorporated herein by reference.) To make them exhaustive, we need to specify a tie-breaking rule when there is more than one nearest neighbor to r. For our present purposes, we want a tie-breaking rule that will make the decoder fair and maximally biased. Such a rule is: chose the nearest neighbor $\lambda$ such that the apparent error $e = r - \lambda$ is as large as possible in the first coordinate, then the second, and so forth. Equivalently, resolve ties to the nearest neighbor lattice point $\lambda$ which has the smallest first coordinate, then second coordinate, and so forth.

These known decoders, augmented with such a tie-breaking rule, can be used both to efficiently construct Voronoi constellations and to map from data symbols to constellation points.

Figure 2:
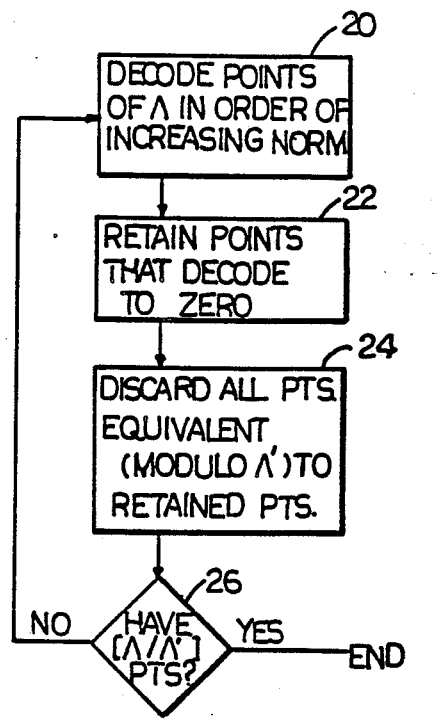
FIG. 2 is a flow-chart for generating a fundamental region.

Referring to FIG. 2, to construct a Voronoi constellation, given a lattice Λ, a sublattice Λ', and a maximally biased FEMD decoder for Λ', we may decode the points of Λ in order of increasing norm (20), retaining (22) those which decode to 0, and discarding all those that do not decode to 0 (i.e., are equivalent to retained points modulo Λ') (22), until we obtain $|\Lambda/\Lambda'|$ points, one point from each equivalence class (26). The norms that we have to consider are bounded by $r_{max}^2$, the maximum squared distance from any point r in N-space to a point in Λ'. This yields the untranslated constellation $C_0$; subtracting its mean c (step 18, FIG. 1), we obtain C.

Alternatively, we may start from a set of $|\Lambda/\Lambda'|$ points of Λ known to include one point from each equivalence class; e.g., the set of points of Λ that lie within some known fundamental region R of Λ'. If we decode each such point a to a lattice point $\lambda$ of Λ', then the apparent error $e = a - \lambda$ is the corresponding point equivalent to a that decodes to 0; therefore the apparent errors define the points in $C_0$.

Conway and Sloane, "A Fast Encoding . . .", cited above, note that when $\Lambda = M\Lambda$, each of the $M^N$ N-tuples of integers modulo M maps to a different equivalence class of Λ/MΛ, where the map is to the a which is the sum of the products of the coordinates of the N-tuples with the N generators of Λ. A decoder for Λ' may then map a to the corresponding point e in $C_0$. This is an efficient map from a data word, represented as an N-tuple of integers modulo M, to points in $C_0$. To map to points in C, translate by c.

Returning to the case of a general sublattice Λ' (where Λ' is not necessarily MΛ), if a similarly simple map is known from one of $|\Lambda/\Lambda'|$ data words to points a in different equivalence classes of Λ/Λ', this map plus an efficient decoder makes an efficient map from data words to points in a Voronoi constellation C.

THE TWO-DIMENSIONAL HEXAGONAL LATTICE $A_2$

As an example of a two-dimensional Voronoi constellation, consider the two-dimensional hexaqonal lattice $A_2$ defined as the set of all points that are sums of integer products of the two generators (1,0) and ($\frac{1}{2}$, $\sqrt{3}/2$). In this form it has $d_{min}^2 = 1$.

This lattice and the 16-point constellation associated with the partition $A_2/4A_2$ were considered in Conway and Sloane, "A Fast Encoding Method . . .", cited above. They are considered again here for comparison and because the 2D case is easy to visualize.

The Voronoi region of $A_2$ is a hexagon with sides of length $\sqrt{3}/3$, and with area $\sqrt{3}/2$. The fundamental region R of $A_2$ that is in accord with the general method discussed above (i.e., is maximally biased) is the region consisting of the interior of this hexagon plus the points on the boundary with strictly positive first coordinate; i.e., only the two vertices ($\frac{1}{2} \pm \sqrt{3}/6$) are included.

Figure 3:
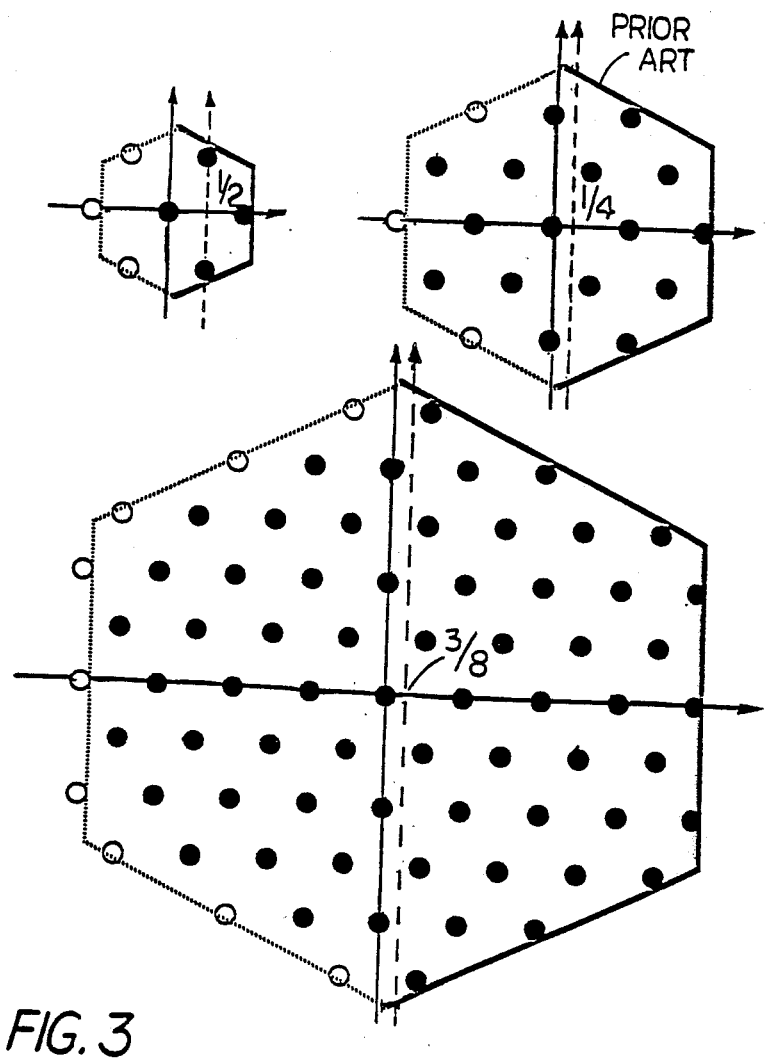
FIG. 3 shows three untranslated Voronoi-type constellations.

The lattice $MA_2$ is a sublattice of $A_2$ of order $M^2$ for any integer M such that $M^2$ is a norm of a point in $A_2$. This includes any M which is a power of two, for which $A_2/MA_2$ is a partition whose order is a power of 4. The 4-point, 16-point, and 64-point constellations $C_0$ corresponding to the lattice partitions $A_2/2A_2$, $A_2/4A_2$, and $A_2/8A_2$ are depicted in FIG. 3, with the associated fundamental region of $A_2$. In each case, the solid dots represent points in $C_0$, the hollow dots represents points in the Voronoi region of the sublattice $MA_2$ but not in the fundamental region, and the solid line represents the boundary of the constellation. The axes of constellation $C_0$ are shown solid; the Y-axis of the translated constellation C is shown dashed. These constellations respectively have average power $P(C_0)$ of $3/4 = 0.75$ (−1.25 dB), $9/4 = 2.25$ (3.52 dB), and 9 (9.54 dB); their means are $c = (\frac{1}{2}, 0)$, (1/4, 0), and (3/8, 0); and thus the corresponding Voronoi constellations C have average power P(C) equal to $\frac{1}{2} = 0.5$ (−3.01 dB), $35/16 = 2.19$ (3.40 dB), and $567/64 = 8.86$ (9.47 dB). (The estimates for P(C) given by the "integral approximation" of Forney et al., "Efficient Modulation for Band Limited Channels," cited above, are 0.56 (−2.55 dB), 2.22 (3.47 dB), and 8.89 (9.49 dB), respectively.) The 4-point $A_2/2A_2$ constellation is old. The 16-point $A_2/4A_2$ constellation is shown in Conway and Sloane, "A Fast Encoding Method...", cited above. Two non Voronoi 64-point constellations with sliqhtly better P(C) are shown in Forney et al., "Efficient Modulation. . ." .

The constellations of FIG. 3 illustrate some general propositions about fundamental regions R that are maximally biased. Such regions consist of all the points in the interior of the Voronoi region, plus the interiors of half the faces (because the interior of each face has only two nearest neighbors). A point that is contained in the intersection of two or more faces is in R if and only if the interiors of all of those faces are in R. Thus the boundary of R is a compact, open (N−1)-dimensional surface in N-space whose volume is half the volume of the surface of the Voronoi region. In effect, it is trying to be as much like a half-sphere as it can be.

A 4-DIMENSIONAL VORONOI CONSTELLATION

Consider the four-dimensional Schläfli lattice $D_4$, defined as the set of all integer 4-tuples containing an even number of odd integers. In this form it has $d_{min}^2 = 2$.

Figure 4:
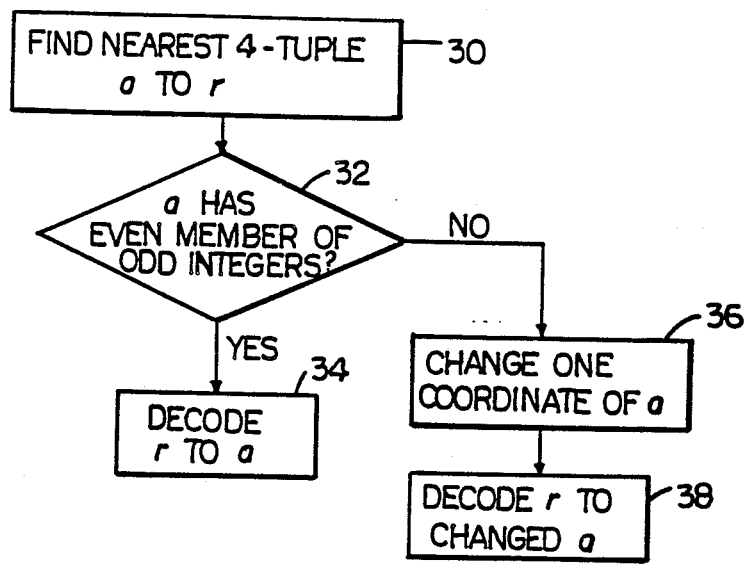
FIG. 4 is a flow-chart for decoding.

Referring to FIG. 4, a simple minimum-distance decoding method for $D_4$ is as follows (see Conway and Sloane "A Fast Encoding Method . . .", and Forney et al., both cited above). For any r, first find the nearest integer 4-tuple a to r (30). Then check whether a has an even number of odd integers (32). If so, accept it (34). If not, change one coordinate of a to the next closer integer in the coordinate where this will result in the smallest change (36) and decode r to the changed a (38).

The tie-breaking rule (where two lattice points are equally near to point r) that is maximally biased is as follows. In the first decoding step, round downwards to the next lower integer on a coordinate by coordinate basis; that is, if a coordinate is equal to $a+\frac{1}{2}$, where a is an integer, break the tie in favor of a rather than $a+1$. In the second step, let $e=r-a$ be the apparent error N-tuple, and let S be the set of coordinates in which e has maximum magnitude. If a is not an element of $D_4$ and S contains more than one element, reduce a by 1 at the first coordinate in S for which e then changes from a negative to a positive value. If there is no coordinate of e in S which is negative, increase a by 1 in the coordinate corresponding to the last coordinate of S.

There are 24 points in $D_4$ having the minimum norm 2, corresponding to all possible permutations and sign changes of the 4-tuple ($\pm 1$, $\pm 1$, 0, 0). The Voronoi region of $D_4$ has only 24 faces, one corresponding to each of these points. The fundamental region R corresponding to the above tie breaking rule consists of the interior of the Voronoi region, plus the interiors of the 12 faces corresponding to the norm-2 points whose first nonzero coordinate has a positive sign, plus the points which are in the intersections of the included faces. This fundamental region forms the basis of Voronoi constellations as follows.

In four dimensions, $Z^4/D_4/RZ^4/RD_42D_4/2RZ^4/2RD_4/4Z^4/4D_4/\ldots$ is an infinite chain of 2-way lattice partitions, where R is the norm-doubling orthogonal transformation given by the $4\times 4$ matrix:

$$R = \begin{matrix} 1 & 1 & 0 & 0 \\ 1 & -1 & 0 & 0 \\ 0 & 0 & 1 & 1 \\ 0 & 0 & 1 & -1 \end{matrix}$$

Note that $D_4$ consists of the points in $Z^4$ of even norm and is a sublattice of order 2 of the lattice $Z^4$. $RZ^4$ is obtained from $Z^4$ by rotation and scaling. By taking an appropriate pair of lattices from this chain, we can generate Voronoi constellations with a number of points equal to any power of two, not merely some number $M^4$ (M an integer).

For example, choosing the lattice partition $Z^4/4D_4$ gives a 512-point Voronoi constellation whose points are listed in Table I below. The listing is by shape in order of increasing norm, where the shape of a 4-tuple is the set of the magnitudes of its elements. For each shape, we also list its norm $r^2$; the total number n of points in $Z^4$ of that shape which can be obtained by permutations and sign changes; the number # of nearest neighbors in $4D_4$ to any 4-tuple of that shape; the number n/# of 4-tuples of that shape included in a fundamental region R; and finally the mean c of the elements of that shape that fall in a maximally biased fundamental region R. (Note that for any shape that lies in the interior of the Voronoi region, $\#=1$ and $c=0=(0, 0, 0, 0)$.)

TABLE 1

The Voronoi constellation determined by the partition $Z^4/4D_4$

| shape | $r^2$ | n | # | n/# | mean |
|---|---|---|---|---|---|
| 0000 | 0 | 1 | 1 | 1 | 0 |
| 1000 | 1 | 8 | 1 | 8 | 0 |
| 1100 | 2 | 24 | 1 | 24 | 0 |
| 1110 | 3 | 32 | 1 | 32 | 0 |
| 1111 | 4 | 16 | 1 | 16 | 0 |
| 2000 | 4 | 8 | 1 | 1 | 0 |
| 2100 | 5 | 48 | 1 | 48 | 0 |
| 2110 | 6 | 96 | 1 | 96 | 0 |
| 2111 | 7 | 64 | 1 | 64 | 0 |
| 2200 | 8 | 24 | 2 | 12 | $(1,\frac{1}{2},\frac{1}{2},0)$ |
| 2210 | 9 | 96 | 2 | 48 | $(1,\frac{1}{2},\frac{1}{2},0)$ |
| 3000 | 9 | 8 | 1 | 8 | 0 |
| 2211 | 10 | 96 | 2 | 48 | $(1,\frac{1}{2},\frac{1}{2},0)$ |
| 3100 | 10 | 48 | 2 | 24 | $(1,\frac{1}{2},\frac{1}{2},0)$ |
| 3110 | 11 | 96 | 3 | 32 | $(3/2,1,\frac{1}{2},0)$ |
| 2220 | 12 | 32 | 4 | 8 | $(3/2,3/2,1,0)$ |
| 3111 | 12 | 64 | 4 | 16 | $(2,1,\frac{1}{2},0)$ |
| 2221 | 13 | 64 | 4 | 16 | $(2,1,\frac{1}{2},0)$ |
| 2222 | 16 | 16 | 8 | 2 | $(2,2,2,0)$ |
| 4000 | 16 | 8 | 8 | 1 | $(4,0,0,0)$ |
| | | | | 512 | |

From Table 1 we can determine that $P(C_0)=233/32=7.28$ (8.62 dB), $c=(\frac{1}{2},11/32,3/16,0)$, so $|c|^2=413/1024=0.40$, and $P(C)=7043/1024=6.88$ (8.37 dB). (The asymptotic estimate for P(C) given by the "integral approximation" method is 6.93 (8.41 dB), so that already at 512 points P(C) is within 0.04 dB of the asymptote.)

USE OF 4-DIMENSIONAL VORONOI CONSTELLATIONS

Voronoi constellations derived from lattice partitions of the form $Z^4/\Lambda'$, where $\Lambda'$ is a scaled version of $D_4$ or $RD_4$, such as the 512-point constellation based on the partition $Z^4/4D_4$ just described, are useful, for example, with the trellis-coded modulation codes of the kind disclosed and claimed in Wei, U.S. patent application Ser. No. 727,398, filed Apr. 25, 1985, now allowed, assigned to the same assignee as this invention, and incorporated herein by reference.

Figure 5:
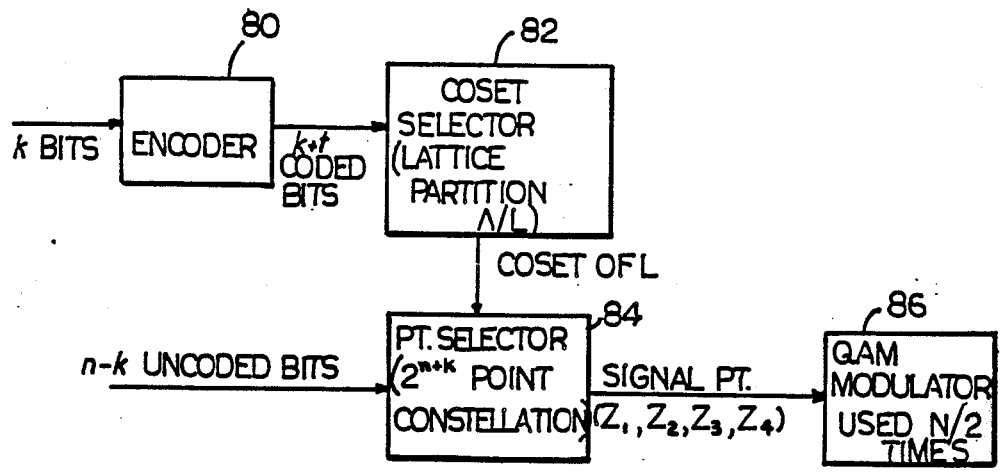
FIG. 5 is a block diagram illustrating a generalized coset code.

The Wei codes are so-called (binary) coset codes. A coset code is defined by an N-dimensional lattice $\Lambda$, an N-dimensional sublattice L of $\Lambda$, where the partition (quotient group) $\Lambda/L$ has order $2^{k+t}$, a rate-k/(k+t) binary encoder E and a $2^{n+t}$ point signal constellation C of points in a coset of $\Lambda$, comprising $2^{k+t}$ subsets of $2^{n-k}$ points each, each such subset consisting of points in a distinct coset of L. Referring to FIG. 5, in circuitry for implementing a generalized coset code, an encoder 80 takes in k bits per N-dimensional symbol and puts out k+t coded bits, which select a subset (one of the $2^{k+t}$ cosets of L) in a coset selector 82 based on lattice partition N/L. An additional n-k uncoded bits per N-dimensional symbol then selects (in a point selector 84) a particular signal point from that subset. The N-dimensional signal point is determined by N coordinates ($z_1$, $z_2$, . . . $z_n$), which may be transmitted by N/2 uses of a QAM modulator 86 (assuming that N is even). Such a coset code transmits n bits per N-dimensional signal point.

Figure 6:
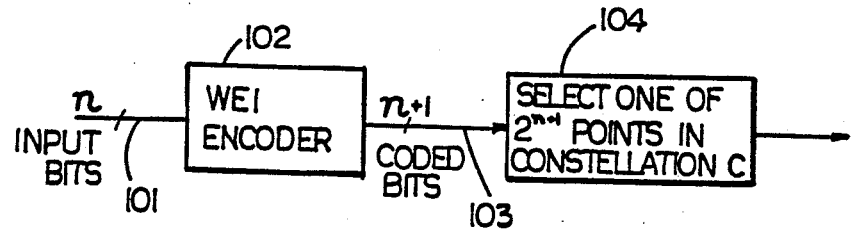
FIG. 6 is a block diagram of a coset code.

Referring to FIG. 6, the four-dimensional coset codes of Wei have the following general characteristics. To send an even integer number n of bits per four dimensional data symbol, n input data bits (101) at a time are grouped for encoding. An encoder (102) (which may perform a number of operations, such as rate $-\frac{2}{3}$, convolutional encoding (t=1), differential encoding, and/or scrambling) generates n+1 encoded bits 103, which must select one of $2^{n+1}$ points (data words) from a signal constellation C whose points are drawn from a coset of the 4-dimensional integer lattice $Z^4$. Note that encoder 102 of FIG. 6 corresponds to encoder 80 of FIG. 5, if one views the n−k uncoded bits as also passing through encoder 80. Selector 104 corresponds to selectors 82, 84 of FIG. 5.

As an example, a Wei-type coset code for sending 8 bits per 4 dimensions) in which $\Lambda = Z^4$ (N=4), L=RD$_4$, k=2, k+t=3 (t=1), and n=8 can be implemented using the $2^9$(=512) point Voronoi constellation C of points in a coset of $Z^4$ as follows. (Note that the Conway and Sloane method cannot produce $2^{2k+1}$-point constellations in 4 dimensions.). The constellation divides evenly into $|Z_4/RD_4| = 2^{k+t} = 2^3 = 8$ subsets, each consisting of $2^6$ points drawn from a distinct coset of RD$_4$. In general, such Voronoi constellations are more nearly spherical and, therefore require less average energy then the generalized cross constellations given by Wei. For example, the 512-point four-dimensional generalized cross constellation built up from the 24-point two-dimensional constellation consisting of the 16 least-energy half-integer 'inner points' and 8 'outer points' has average energy 7 (8.45 dB), about 0.08 dB worse than the Voronoi constellation specified by Table 1. These advantages are achieved by constructing the Voronoi constellation based on the Voronoi region of a sublattice $\Lambda'$ of $\Lambda$ where the sublattice (e.g., 4D$_4$) is other than a scaled version of lattice $\Lambda$ (e.g., $Z^4$).

The eight cosets from which the eight subsets are drawn are defined respectively as the points in RD$_4$ summed with one of the following coset representatives:

| |
|---|
| (0, 0, 0, 0) |
| (1, 0, 0, 0) |
| (0, 1, 0, 0) |
| (1, 1, 0, 0) |
| (0, 0, 1, 0) |
| (0, 1, 0, 0) |
| (0, 1, 1, 0) |
| (1, 1, 1, 0) |

Note that the coset representatives are all eight four-tuples in which the first three coordinates are either 1 or 0 and the last coordinate is 0 (which corresponds to the following fundamental region of RD$_4$: {r: $0 \leq r_1 < 2$, $0 \leq r_2 < 2$, $0 \leq r_3 < 2$, $0 \leq r_4 < 1$}).

Figure 7:
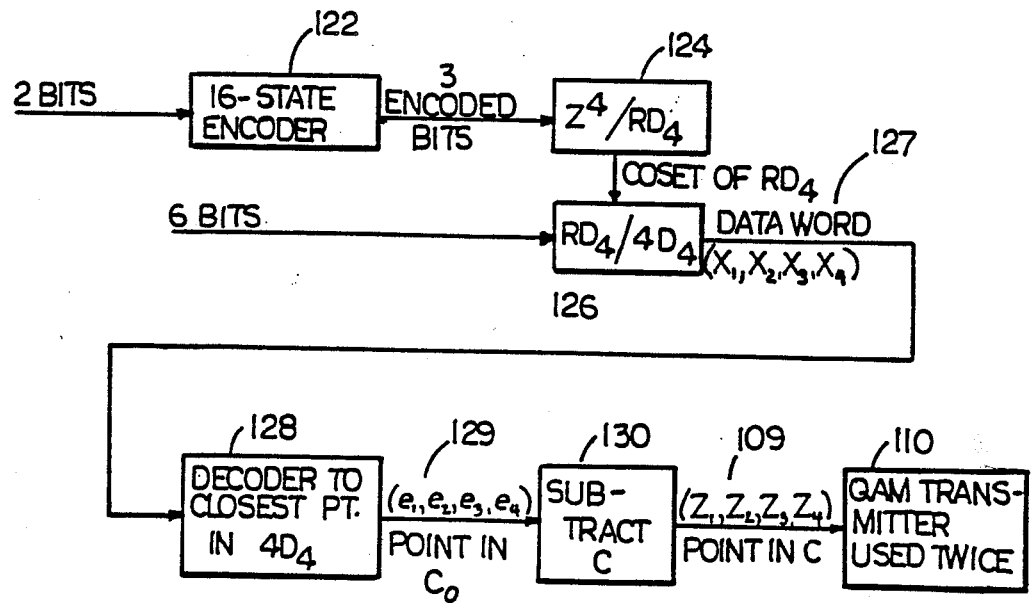
FIG. 7 is a block diagram illustrating a Wei-type coset code.

Referring to FIG. 7, two of the original eight bits are encoded as three bits (in 16-state encoder 122) and are used (in selector 124) to select one of the eight cosets in the eight-way partition $Z^4/RD_4$. The other six bits select (in selector 126) one of 64 points in the chosen coset where each of the 64 points belongs to one of the 64 cosets of the 64-way partition $|RD_4/4D_4|$. Specifically data word x consists of a first coordinate $x_1$, which is one of the 8 integers in the range $0 \leq j < 8$, i.e., $x_1 \epsilon \{0, 1, ..., 7\}$; and three additional 4-valued coordinates $x_2, x_3, x_4 \epsilon \{0, 1, 2, 3\}$. Each of the $8 \times 4 \times 4 \times 4 = 512$ such data words ($x_1, x_2, x_3, x_4$) is in a different equivalence class modulo 4D$_4$. The four coordinates of the data word delivered by selector 126 may be expressed in a standard binary representation as follows:

| $x_{13}$ | | | |
|---|---|---|---|
| $x_{12}$ | $x_{22}$ | $x_{32}$ | $x_{42}$ |
| $x_{11}$ | $x_{21}$ | $x_{31}$ | $x_{41}$ | where each column represents the successive bits of one of the coordinates (e.g., $x_{12}$ is the second bit of the first coordinate). Selector 124 uses the three coded bits to specify bits $x_{11}, x_{21}, x_{31}$ so that the cosets of RD$_4$ are specified in accordance with the Wei code, as we shall discuss in more detail below. Selector 126 uses the six uncoded bits to specify the remaining coordinates $x_{13}$, $x_{12}, x_{23}, x_{32}$, and $x_{42}$, and $x_{41}$.

Referring again to FIG. 7, data word x is decoded (in decoder 128) to the nearest point in 4D$_4$ using the maximally biased decoder. The resulting apparent error vector e (129) is the point of the equivalence class defined by the data word that lies in C$_0$. Translate by c (130) to reach the corresponding point in C (109). Finally z=e−c is sent by a QAM transmitter 110 used twice.

Similarly, it is necessary at the receiver to find the data word corresponding to a given decoded Voronoi constellation point. To do this, translate by c and then find the residues of the four coordinates modulo 4. This determines the last three coordinates; the first coordinate is either the residue so determined or that residue plus 4, whichever is in the same equivalence class as the translated, decoded point modulo 4D$_4$. This can be determined by subtracting the residues from the translated decoded point and determining whether the difference (whose coordinates are all multiples of 4) contains an even or odd number of multiples of 4; addition of 4 to the first coordinate is necessary in the latter case.

It is not necessary that the dimension of the Voronoi constellation be equal to the dimension of the lattices used in the code. For example, a sequence of four 4-dimensional symbols from the Wei code (represented by 4n+4 coded bits) can be mapped into a signal point of a 16-dimensional Voronoi constellation based on a lattice partition $Z^{16}/\Lambda'$, where $\Lambda'$ is a 16-dimensional lattice of the type of the Barnes-Wall lattice (Forney et al., 1984). For example, for n=8, there are $2^{36}$-point Voronoi constellations based on the lattice partition $Z^{16}/2R\Lambda_{16}$ which can be used with the Wei code. To map from bits to points, first create a 16-dimensional data word with five coordinates taking on one of 8 values, ten coordinates taking on one of 4 values, and one coordinate taking on one of two values, such that the resulting $2^{36} = 8^5 \times 4^{10} \times 2$ data words each fall in a distinct equivalence class of $2R\Lambda_{16}$. Then decode to the closest point in $2R\Lambda_{16}$ (see: Forney, U.S. patent application Ser. No. 828,397, cited above), and transmit the resulting apparent error vector e as 8 successive QAM symbols. Such a 16-dimensional constellation can gain of the order of 0.5 dB over a 4-dimensional constellation.

The above description indicates in general how a Vornoi constelltion maybe used with a Wei-type coset code. We now outline the approach for converting the particular embodiment described in the Wei (patent application) for use with a Voronoi constellation.

Wei's particular embodiment includes a differential encoding feature. To implement differential encoding, the following modifications are necessary. The constellation C must be chosen from the coset of $Z^4$ consisting of the 4-tuples of half-integers, i.e., $z^4 + (\frac{1}{2}, \frac{1}{2}, \frac{1}{2}, \frac{1}{2})$. The encoder now takes 3 bits in per 4-dimensional signal point, called $I1_n$, $I2_n$, $I3_n$ (as in FIG. 7 of Wei). A differential encoder converts $I2_n$, $I3_n$, to $I2_n$, $I3_n$. A 16-state rate $\frac{2}{3}$ convolutional encoder generates a parity bit $Y0_n$. The four bits $Y0_n$ $I1_n$, $I2_n$, $I3_n$ are converted to four bits $Z0_n$, $Z1_n$, $Z0_{n+1}$, $Z1_{n+1}$ in a bit converter. The four coordinates $x_1$, $x_2$, $x_3$, $x_4$ are then expressed in standard binary representation as $$x_1 = x_{13}x_{12}x_{11} . 1$$
$$x_2 = x_{22} x_{21} . 1$$
$$x_3 = x_{32} x_{31} . 1$$
$$x_4 = x_{42} x_{41} . 1$$

where the "0.1" indicates the binary fraction $\frac{1}{2}$. The mapping rules are

| $Z0_n Z1_n$ | $x_{11}x_{21}$ | $Z0_{n+1}Z1_{n+1}$ | $x_{31}x_{41}$ |
|---|---|---|---|
| 00 | 00 | 00 | 00 |
| 01 | 11 | 01 | 11 |
| 10 | 10 | 10 | 10 |
| 11 | 01 | 11 | 01 | which can be expressed by the binary (modulo 2) equations $x_{21} = Z1_n$, $x_{11} = Z0_n + Z1_n$, etc. The remaining five bits $x_{13}$, $x_{12}$, $x_{22}$, $x_{32}$, and $x_{42}$ are specified by 5 uncoded bits. (This is to send n = 8 bits per 4-dimensional symbol.

To send n = 14 bits per 4D symbol, as in Wei's FIG. 7, the data word coordinates are represented as $$x_1 = x_{14}x_{13}x_{12}x_{11} . 1$$
$$x_2 = x_{24}x_{23}x_{22}x_{21} . 1$$
$$x_3 = x_{34}x_{33}x_{32}x_{31} . 1$$
$$x_4 = x_{43}x_{42}x_{41} . 1,$$

$x_{11}$, $x_{21}$, $x_{31}$, and $x_{41}$ are specified as above (using 3 input bits $I1_n$, $I2_n$, $I3_n$). and the remaining 11 bits $x_{14}$, $x_{13}$, $x_{12}$, $x_{24}$, $x_{23}$, $x_{22}$, $x_{34}$, $x_{33}$, $x_{32}$, $x_{43}$, $x_{42}$ are specified by the remaining bits $I1-7_{n+1}$, $I4-7_n$.)

MODEM CIRCUITRY

Figure 8:
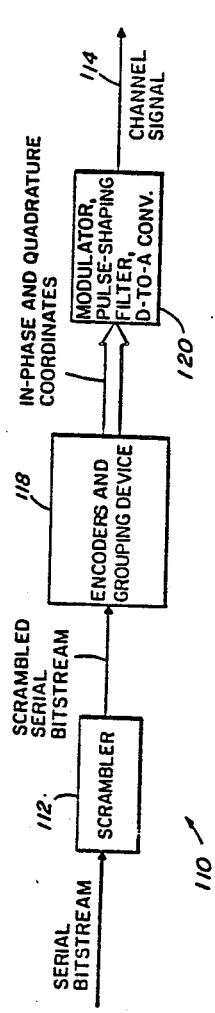
FIGS. 8, 9 are block diagrams of a modem transmitter and receiver.

The Voronoi constellation may be used in modem circuitry for sending digital data over a noise-affected channel. Referring to FIG. 8, in modem transmitter 111 a scrambler 112 receives a serial bitstream of information to be sent over a channel 114. The scrambled information bits are then delivered to encoders and grouping device 118 at a rate of Q bits per signaling interval. Thus, the bits appearing at the input of encoders and grouping device 118 with respect to a given signaling interval (for example, the ith signaling interval) can be denoted $I1_i$ through $IQ_i$. Based on the information bits appearing with respect to a block of some number N/2 of successive signaling intervals (that is the information bits $I1_q$ through $IQ_q$, for $q = i, i+1, \ldots, i+N/2-1$), the encoders and grouping device 118 deliver to modulator 120 N/2 pairs of in-phase and quadrature coordinates in series, one pair in each signaling interval, each pair corresponding to a point in a two-dimensional (2D) signal constellation. These pairs of coordinates are then used in modulator 120 to modulate a carrier. The modulated carrier is then pulse-shape filtered, and then D-to-A converted to an analog signal for transmission over channel 114, as in a conventional Quadrature-Amplitude-Modulated (QAM) carrier system.

For example, in FIG. 6, n/2 bits per signaling internal are grouped and encoded into a code vector ($z_1$, $z_2$, $z_3$, $z_4$) which is transmitted as two successive QAM symbols. Encoders and grouping device 118 are arranged, among other things, to map data words to the points of the Voronoi constellation and thus contain information from which the points of the Voronoi constellation can be generated. The mapping may be done in the manner previously described.

Figure 9:
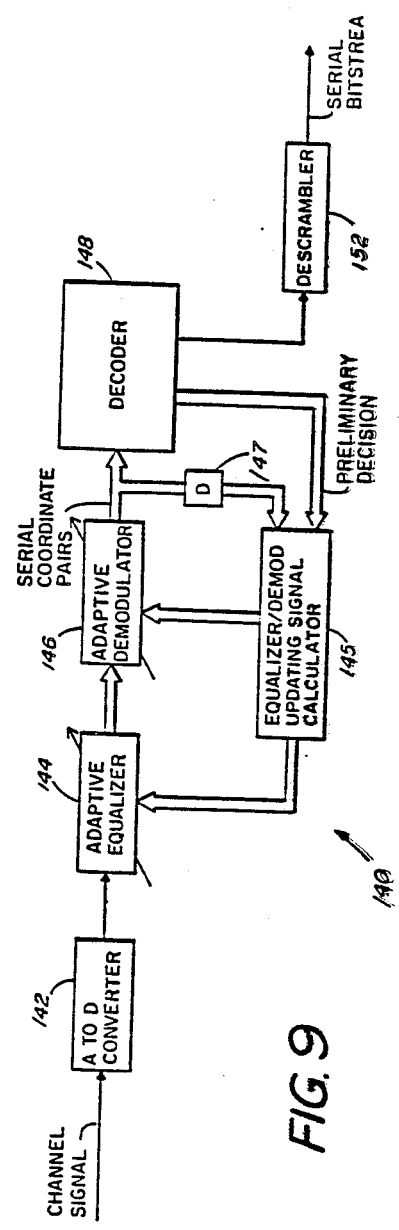

Referring to FIG. 9, in receiver 140, the received modulated carrier channel signal is passed through an A-to-D converter 142, an adaptive equalizer 144, and an adaptive demodulator 146. Equalized and demodulated coordinate pairs are delivered serially from demodulator 146 to a decoder 148. Decoder 148 feeds back preliminary decisions on the received coordinate pairs to equalizer/demodulator updating signal calculator 145. These preliminary decisions are processed in calculator 45 in a conventional manner to generate updating signals for the equalizer and demodulator. The preliminary decisions may be delayed. In that case, the demodulator output will be delayed accordingly by delay element 147 before it is sent to calculator 145. Decoder 148, after a delay of a number of signaling intervals, also delivers to descrambler 152 final decisions of scrambled information bits which were sent. The output of descrambler 152 is the original serial bitstream.

Decoder 148 is arranged, among other things, to decode a received signal to one of the points in the Voronoi constellation and to map each point back to a data word. The decoding and mapping may be done in the manner previously described.

Other embodiments are within the following claims.

I claim:

1. Apparatus for communicating data over a channel comprising
   an encoder for selecting a series of signal points from a constellation of available points, said constellation comprising points of a lattice $\Lambda$ (or a coset of $\Lambda$) that lie within a Voronoi region of a sublattice $\Lambda'$ of $\Lambda$, where $\Lambda'$ is other than a scaled version of $\Lambda$, and
   a modulator for modulating a carrier on said channel in accordance with said selected series of signal points.

2. The apparatus of claim 1 wherein sublattice $\Lambda'$ is a different type from lattice $\Lambda$.

3. The apparatus of claim 1 wherein said constellation is based on points in a fundamental region of sublattice $\Lambda'$ comprising a selection of fewer than all points in said Voronoi region.

4. The apparatus of claim 3 wherein said selection is maximally biased.

5. The apparatus of claim 3 wherein some points of said fundamental region lie on a boundary of said Voronoi region.

6. The apparatus of claim 1 wherein said lattice $\Lambda$ is a version of an integer lattice $Z^N$, N an integer, 7. The apparatus of claim 1 wherein said sublattice $\Lambda'$ is a version of a Schläfli lattice $D_4$.

8. The apparatus of claim 1 wherein said sublattice $\Lambda'$ is a version of a Barnes-Wall lattice $\Lambda_{16}$.

9. The apparatus of claim 1 wherein said series of signal points is selected based on a coset code.

10. Apparatus for communicating data over a channel comprising
    an encoder for selecting a series of signal points from a constellation of available points , said constellation being a Voronoi constellation, said points being selected based on a convolutional code of the coset code type, and a modulator for modulating a carrier in accordance with said selected series of signal points.

11. The apparatus of claim 10 wherein said coset code has the same number of dimensions as said Voronoi constellation.

12. The apparatus of claim 11 wherein said number of dimensions is four.

13. The apparatus of claim 10 is wherein said coset code has a different number of dimensions than said Voronoi constellation.

14. The apparatus of claim 13 wherein said coset code has four dimensions and said Voronoi constellation has sixteen dimensions.

15. A method of mapping from m data bits to a point drawn from a $2^m$-point Voronoi constellation for transmission on a channel based on an N-dimensional lattice partition $\Lambda/\Lambda'$, where sublattice $\Lambda'$ is other than a scaled version of the lattice $\Lambda$, comprising mapping said m bits to one of $2^m$ data words x, each data word x consisting of N coordinates $(x_1, \ldots x_n)$ each coordinate taking on one of a predetermined set of values, the number of elements in all such sets of coordinate values not being identical, each data word being a point in a coset of $\Lambda$ that belongs to a distinct equivalence class modulo $\Lambda'$, decoding said data word x into a point $\lambda$ in $\Lambda'$, and using the apparent error $e = x - \lambda$ (or a translate $e - c$ of said apparent error) as the coordinates of the constellation point to be transmitted.

16. A method of communicating data over a channel comprising selecting a series of signal points from a constellation of available points, the constellation comprising points of a lattice $\Lambda$ (or a coset $\Lambda$) that lie within a Voronoi region of a sublattice $\Lambda'$ of $\Lambda$, where $\Lambda'$ is other than a scaled version of $\Lambda$, and modulating a carrier on said channel in accordance with said selected series of signal points.

17. A method of communicating data over a channel comprising selecting a series of signal points from a constellation of available points, said constellation being a Voronoi constellation, said points being selected based on a convolutional code of the coset code type.

18. The apparatus of claim 10 wherein said Voronoi constellation comprises points of a lattice $\Lambda$ (or a coset of $\Lambda$) that lie within a Voronoi region of a sublattice $\Lambda'$ of $\Lambda$, where $\Lambda'$ is other than a scaled version of $\Lambda$.

* * * * *

UNITED STATES PATENT AND TRADEMARK OFFICE
CERTIFICATE OF CORRECTION

PATENT NO. : 4,894,844

DATED : 1/16/90

INVENTOR(S) : George D. Forney, Jr.

It is certified that error appears in the above-identified patent and that said Letters Patent is hereby corrected as shown below:

Column 1, line 51, "module" should be --modulo--.

Column 2, line 9, "modula" should be --modulo--.

Column 4, line 10, the slash is missing after "/$\Lambda$/$\Lambda$'".

Column 4, line 53, "every" should be underlined.

Column 4, line 68, "$\Lambda$" should be --$\Lambda'$--.

Column 5, line 49, "$\Lambda$" should be --$\lambda$--.

Column 5, line 54, "$\Lambda$" should be --$\Lambda'$--.

Column 6, line 5, "hexaqonal" should be --hexagonal--.

Column 7, line 39, "$RD_4 2D_4$" should be --$RD_4/2Z^4/2D_4$--.

Column 11, line 3, the second occurrence of "$I2_n, I3_n$" should be --$I2'_n, I3'_n$--.

UNITED STATES PATENT AND TRADEMARK OFFICE
CERTIFICATE OF CORRECTION

PATENT NO. : 4,894,844

DATED : 1/16/90

INVENTOR(S) : George D. Forney, JR.

It is certified that error appears in the above-identified patent and that said Letters Patent is hereby corrected as shown below:

Column 11, line 5, "$I2_n, I3_n$" should be --$I2'_n, I3'_n$--.

Signed and Sealed this

Twenty-eighth Day of July, 1992

Attest:

DOUGLAS B. COMER

*Attesting Officer*     *Acting Commissioner of Patents and Trademarks*